United States Patent [19]

Fotland et al.

[11] Patent Number: 5,027,136

[45] Date of Patent: Jun. 25, 1991

[54] METHOD AND APPARATUS FOR CHARGED PARTICLE GENERATION

[75] Inventors: Richard A. Fotland, Holliston; Fred Miekka, Boxborough, both of Mass.

[73] Assignee: Dennison Manufacturing Company, Framingham, Mass.

[21] Appl. No.: 465,810

[22] Filed: Jan. 16, 1990

[51] Int. Cl.[5] .............................................. G01D 15/06

[52] U.S. Cl. ...................................................... 346/159

[58] Field of Search ................................ 346/159, 154

[56] References Cited

U.S. PATENT DOCUMENTS

| | | | |
|---|---|---|---|
| 4,409,604 | 10/1983 | Fotland | 346/159 |
| 4,918,468 | 4/1990 | Miekka et al. | 346/159 |
| 4,985,716 | 1/1991 | Hosaka et al. | 346/159 |

*Primary Examiner*—George H. Miller, Jr.
*Attorney, Agent, or Firm*—Arthur B. Moore

[57] ABSTRACT

Method and apparatus for charged particle generation, particularly for use in electrographic imaging, in which a drive electrode and an isolation electrode are substantially in contact with opposite sides of a solid dielectric member, and a discharge electrode is placed on the same side of the solid dielectric member as the isolation electrode to define a discharge region. A high voltage time varying potential is imposed between the drive electrode and the discharge electrode to produce charged particles in the discharge region, and the isolation electrode is capacitively coupled to the drive electrode but otherwise is electrically isolated. The discharge electrode and isolation electrode are not coplanar and the discharge region does not border on the solid dielectric member. In a first embodiment, a dielectric shelf is placed intermediate an apertured discharge electrode and the isolation electrode, to facilitate the inception of discharges. In an alternative embodiment the discharge electrode is an elongate structure placed over the isolation electrode and supported by an apertured dielectric layer.

11 Claims, 5 Drawing Sheets

METHOD AND APPARATUS FOR CHARGED PARTICLE GENERATION

The present invention relates to the generation of charged particles, and more particularly to the generation of charged particles for electrographic imaging.

Charged particles (i.e., as used in the specification and claims of this application, ions and electrons) for use in electrographic imaging can be generated in a wide variety of ways. Common techniques include the use of air gap breakdown, corona discharges, and spark discharges. Other techniques employ triboelectricity, radiation (alpha, beta, and gamma as well as x-rays and ultraviolet light), and microwave breakdown. When utilized for the formation of latent electrostatic images, all of the above techniques suffer certain limitations in charged particle output currents and charge image integrity.

A further approach which offers significant advantages in this regard is described in U.S. Pat. No. 4,155,093 and the improvement U.S. Pat. No. 4,160,257. These patents disclose method and apparatus for generating charged particles in air involving what the inventors term "glow discharge" or alternatively "silent electric discharge". With reference to the prior art view of FIG. 1, a high voltage alternating potential 10 is applied between two electrodes ("driver" and "control" electrodes 11 and 13) separated by a solid dielectric member 15 (driver electrode 11 is shown with an encapsulating dielectric 16). As disclosed in U.S. Pat. No. 4,155,093, the alternating potential causes the formation of a pool or plasma 13*p* of positive and negative charged particles in an air region 14 adjacent the dielectric 15 and an edge surface 13*e* of the control electrode 13, which charged particles may be extracted to form a latent electrostatic image. (Note: Inasmuch as electrons as well as ions may be involved in glow discharge electrostatic imaging in certain cases, the more comprehensive term "charged particles" is used herein.) The alternating potential 10 creates a fringing field between the two electrodes and, when the electrical stress on the fringing field region exceeds the dielectric strength of air, a discharge occurs quenching the field. Such silent electric discharge causes a faint blue glow and occurs at a characteristic "inception voltage". Charged particles of a given polarity may be extracted from the plasma 13*p* by applying a bias potential 19 of appropriate polarity between the control electrode 13 and a further electrode 17, thereby attracting such charged particles to a dielectric member 18 to form a latent electrostatic image. In the preferred embodiment, shown in FIG. 1, negatively charged particles (which have greater mobility) are extracted.

With reference to the prior art view of FIG. 2, U.S. Pat. No. 4,160,257 discloses the use of an additional ("screen") electrode 22, separated from the control electrode 13 by insulating spacer layer 24, to screen the extraction of charged particles, thereby providing an electrostatic lensing action and preventing accidental image erasure. Charged particles are permitted to pass through the screen aperture 26 to the imaging surface 18 when the screen potential 27 assumes a value of the same polarity and lesser magnitude as compared with the control potential or bias 19. The screen potential is limited by the danger of arcing from screen electrode to dielectric member 18.

As seen in the prior art view of FIG. 3, the charged particle generators of the above-discussed patents may be embodied in a multiplexed print head 30, wherein an array of control electrodes 13 contain holes or slots 34 at crossover regions opposite the drive electrodes 11 (sometimes called "RF lines" in view of the use of radio frequency drive voltages) in a matrix arrangement. These structures are shown mounted to an aluminum mounting block 25 which provides structural support for the matrix addressable print cartridge. Driver electrodes are intermittently excited, and any dot in the matrix may be printed by applying a data, or control, pulse to the appropriate control electrode at the time that the appropriate RF line is excited.

In the assignee's current commercial embodiment of the charged particle imaging apparatus discussed above, the solid dielectric member 15 (FIG. 2) comprises a sheet of mica. Mica has been preferred due to its high dielectric strength and other advantageous properties which are needed in the high voltage, ozone discharge environment. The mica sheet is bonded to stainless steel foils using pressure sensitive adhesive (not shown in FIG. 2), and the foils etched in a desired electrode pattern, as disclosed in U.S. Pat. No. 4,381,327. This fabrication provides excellent charged particle output currents over a reasonable service life. Nonetheless, an intensive ongoing effort has been made by the assignee and others to improve the performance and durability of such devices. Various failure mechanisms have been observed, including intrinsic "hard" failure mechanisms (mica dielectric failure, drive line shorting, corona induced insulator failure), intrinsic "soft" failures (steel corrosion, mica surface changes, formation of discharge salts, etching of adhesive bonding control electrode to dielectric) as well as extrinsic failure such as contamination from atmospheric environmental substances and other materials.

Japanese Patent Application Laid Open No. 61-112658(1986) of Canon Limited discloses an electrographic imaging process and apparatus in which, in a first version, an excitation electrode and first discharge electrode are placed face to face on opposite sides of a solid dielectric member, with a second discharge electrode placed to the first electrode in a coplanar arrangement. An alternating voltage is placed between the excitation electrode and first electrode, and due to the capacitive coupling of the excitation electrode and first discharge electrode a silent electric discharge may be generated between the two discharge electrodes. In a variant of this system, a second excitation electrode is provided facing the second excitation discharge electrode. By generating the silent electric discharge between the discharge electrodes, rather than between a discharge electrode and the solid dielectric member, the 658 system can reduce the damage to the dielectric. However, since the discharge still occurs in close proximity to the solid dielectric between coplanar electrodes contacting this body, repeated discharges may cause "tracking", i.e. the formation of locallized conductive regions on the solid dielectric, and eventual failure of the dielectric.

Accordingly, it is a principal object of the invention to provide an improved charged particle generator of the type employing "silent electric discharges". Related objects are to reduce the likelihood of hard and soft failures in such devices, particularly due to damage to the solid dielectric member.

A further object is to allow the use of solid dielectrics with inferior electrical properties, for the sake of economy.

SUMMARY OF THE INVENTION

In fulfilling the above and additional objects, the invention provides an improved charged particle generator comprising a "drive" electrode substantially in contact with one side of a first solid dielectric member; an "isolation" electrode substantially in contact with the other side of the solid dielectric member opposite the drive electrode; a "discharge" electrode at the same side of the solid dielectric as the isolation electrode, said discharge electrode being separated from the first solid dielectric member and from said discharge electrode by a second solid dielectric member, wherein the isolation electrode, discharge electrode and second solid dielectric member define a discharge region which does not border on the first solid dielectric member. A high voltage time varying potential ("excitation potential") is imposed between the drive and discharge electrodes, and the isolation electrode is capacitively coupled to the drive electrode but otherwise electrically isolated. The excitation potential may cause the generation of charged particles in a discharge region between the discharge electrode and isolation electrode; the discharge region does not border on the solid dielectric member thereby protecting the latter member from the destructive effects of such electrical discharges. A direct current "extraction voltage" between the discharge electrode and a further electrode member may cause the extraction of charged particles of a certain polarity for use in electrostatic imaging.

In a first embodiment of the invention, the discharge electrode has an aperture through which the charged particles may be extracted, such aperture being aligned with the isolation electrode. A dielectric "shelf" is placed intermediate the discharge electrode and the isolation electrode, and the discharge region is defined by the discharge electrode, the isolation electrode, and the dielectric shelf. Applicant has observed that upon the excitation potential's reaching a threshold value, electric discharges will commence between the discharge electrode and the dielectric shelf, followed by discharges directly between the discharge electrode and isolation electrode.

In the above-described charge particle generators the isolation electrode may comprise a circular metal disk or other compact structure which defines a given discharge site. The discharge electrode and drive electrode may comprise transversely oriented elongate electrodes, in a matrix crossover arrangement.

The discharge electrode may be separated from the dielectric shelf by a dielectric spacer layer which exposes a substantial region of the dielectric shelf. Most preferably, if the dielectric shelf layer is etched through by electrical discharges, it will expose a portion of the isolation electrode, rather than the solid dielectric member.

In an alternative embodiment of the invention, the discharge electrode comprises an elongate structure which is located over the isolation electrode. A dielectric layer supports the discharge electrode and defines a discharge region intermediate the isolation electrode and discharge electrode. The elongate discharge electrode may comprise, for example, a wire or strip electrode. Advantageously an array of elongate drive electrodes are transversely oriented to an array of said elongate discharge electrodes to provide a matrix addressable electrostatic print device.

As in the first embodiment, the isolation electrodes are compact electrodes such as circular disks, each such electrode defining a single discharge site.

BRIEF DESCRIPTION OF THE DRAWINGS

The above and additional aspects of the invention are illustrated on the following brief description of the preferred embodiment, which should be taken together with the drawings in which.

DETAILED DESCRIPTION

Figure 4:
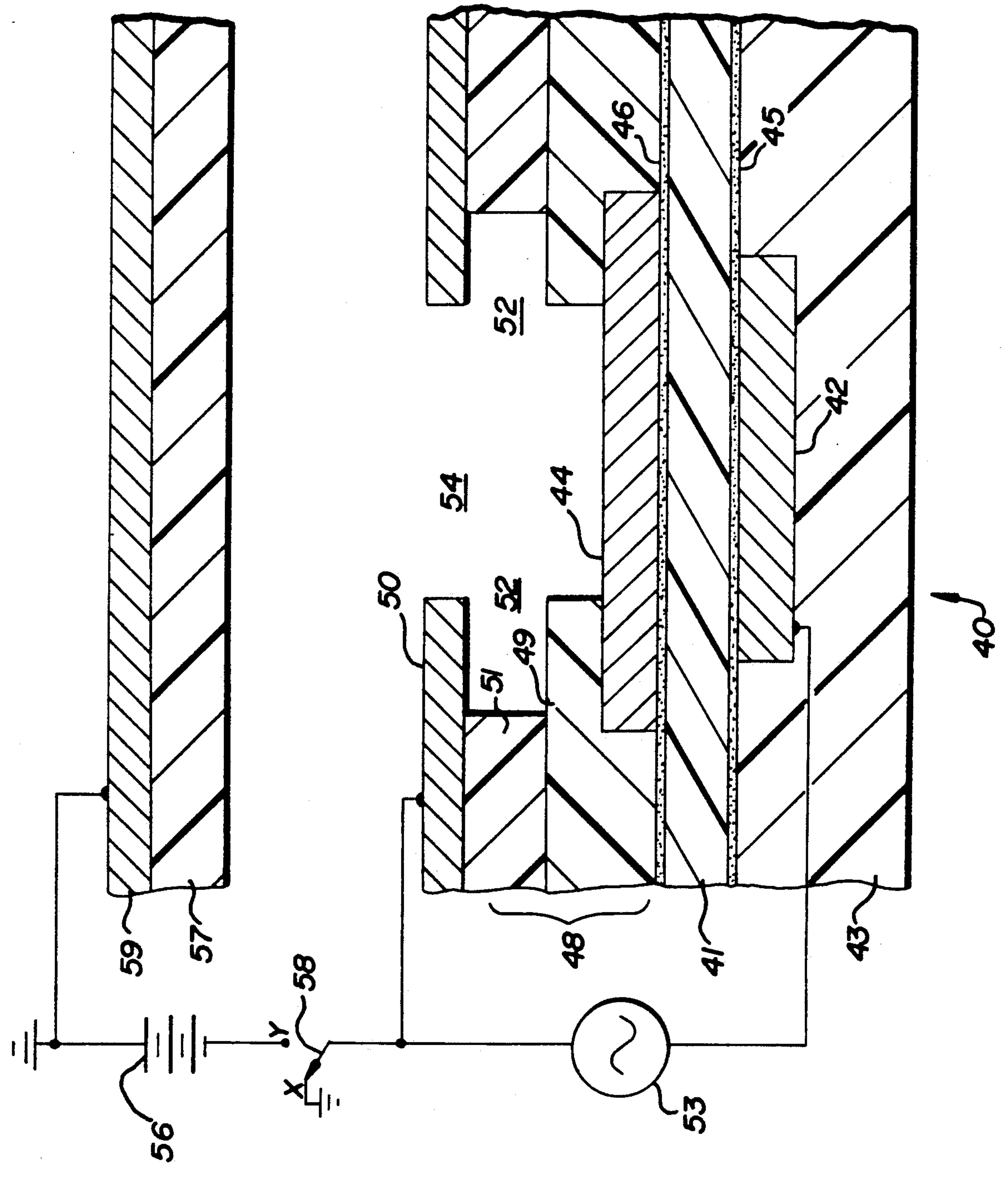
FIG. 4 is a sectional schematic view of a charged particle generator in accordance with a first embodiment of the invention.

Reference should now be had to FIG. 4 which illustrates a charged particle generator according to a first embodiment of the invention. As seen in this sectional schematic view, charged particle generator 40 includes a solid dielectric layer 41 carrying on one side a drive electrode 42 and on the opposite side an isolation electrode 44. Electrodes 42, 44 may be bonded to dielectric 41 by adhesive layer 45, 46, and an encapsulating layer 43 may be provided to prevent electrical discharges at the drive electrode 42. Charged particle generator 40 includes a third, "discharge" electrode 50 which is separated from the isolation electrode 44 by dielectric 48. Discharge electrode 50 includes an aperture 54 which is aligned with the isolation electrode 44. Dielectric 48 advantageously consists of two layers, a shelf layer 49 which partially covers the isolation electrode, and a recessed spacer layer 51.

A high voltage time varying potential 53 ("excitation potential") is imposed between the drive electrode 42 and the discharge electrode 50. Isolation electrode 44 receives no direct electrical potential, but because of the capacitive coupling of this electrode and the drive electrode 42, the excitation potential 53 may cause electrical discharges in a discharge region 52 between electrodes 44, 50 as discussed below. To extract charged particles for electrographic imaging, a direct current extraction potential 56 may be imposed between the discharge electrode 50 and a counterelectrode 59, thereby to attract charged particles of a certain polarity (in FIG. 4, negatively charged particles) to a dielectric imaging member 57.

Figure 2:
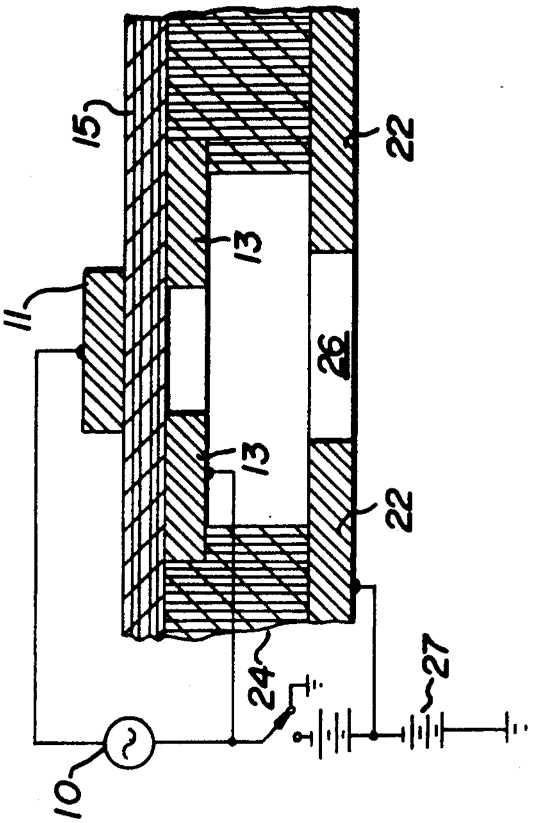
FIG. 2 PRIOR ART
FIG. 2 is a sectional schematic view of a prior art charged particle generator in accordance with U.S. Pat. No. 4,160,257.
Figure 1:
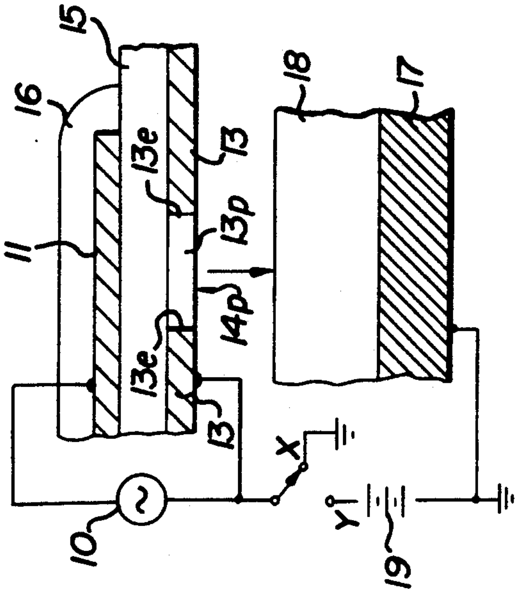
FIG. 1 PRIOR ART
FIG. 1 is a sectional schematic view of a prior art charged particle generator in accordance with U.S. Pat. No. 4,155,093.
Figure 3:
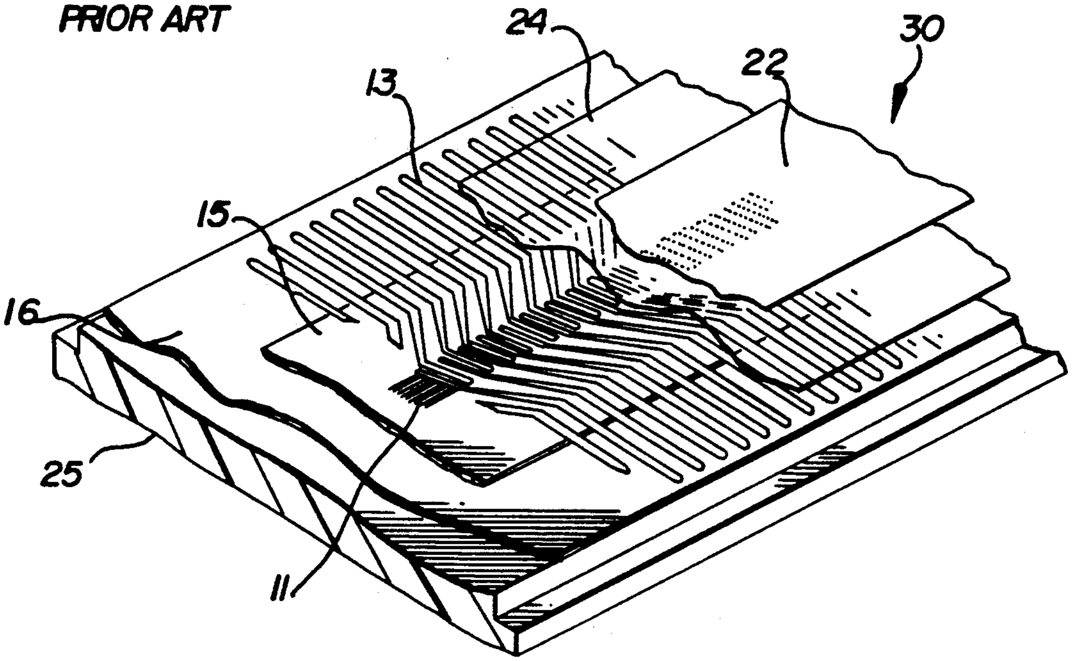
FIG. 3 PRIOR ART
FIG. 3 is a partial perspective view of a prior art matrix print head of the type shown in FIG. 2.

As illustrated below in Examples 1, 2 the construction illustrated in FIG. 4 permits the design of economical particle generators incorporated dielectric materials of inferior electrical properties for layer 41, and reduces the likelihood of corrosion and hard failure of the dielectric 41—a principal cause of failure of prior art charged particle generators. Applicants have empirically determined that the use of a dielectric structure 48 with a shelf 51 separated from the discharge electrode 50 by an air gap 52 lowers the inception voltage for charged particle generation. It has been observed that during one or more initial cycles upon achieving the inception voltage a discharge occurs between discharge electrode 50 and dielectric shelf 49, followed in later cycles by a discharge directly between the electrodes 44, 50. Since the shelf dielectric 49 may be eroded during prolonged operation it is desirable to extend the isolation electrode 44 so that complete etch-through of dielectric 49 will expose electrode 44 rather than dielectric 41—thereby protecting the latter. By defining a discharge region which does not border on the solid dielectric member 41, the invention eliminates the predominant failure mode of prior art devices of the type illustrated in FIGS. 2, 3.

Figure 5:
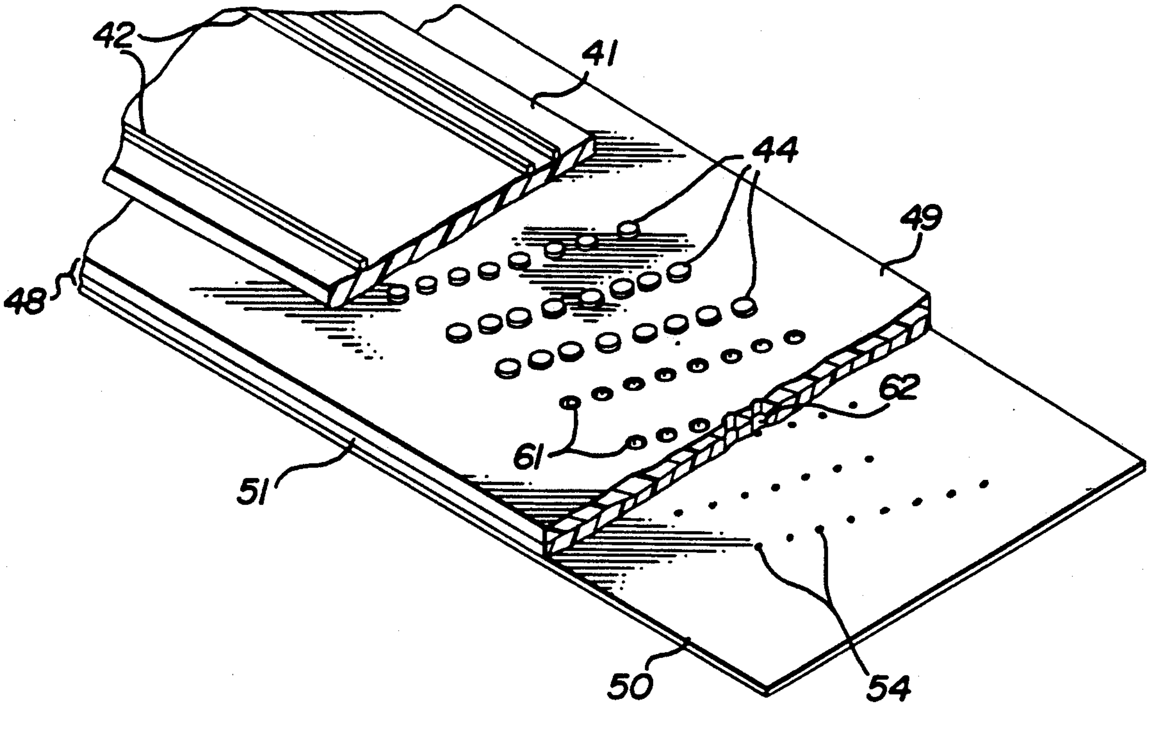
FIG. 5 is a partial perspective view of the charged particle generator of FIG. 4.

FIG. 5 shows a partial perspective view of a charged particle generator 40 of the type shown in FIG. 4. This view shows an array of isolation electrodes 44 wherein each electrode comprises a compact structure electrically isolated from the remaining electrodes of device 40. Specifically, each isolation electrode 44 takes the form of a circular disk. FIG. 5 also shows the two layer dielectric 48, including layers 49, 51 respectively containing a series of apertures 61, 62. A discharge electrode 50 contains series of apertures 54 aligned with respective isolation electrodes 44 and with apertures 61, 62.

Figure 6:
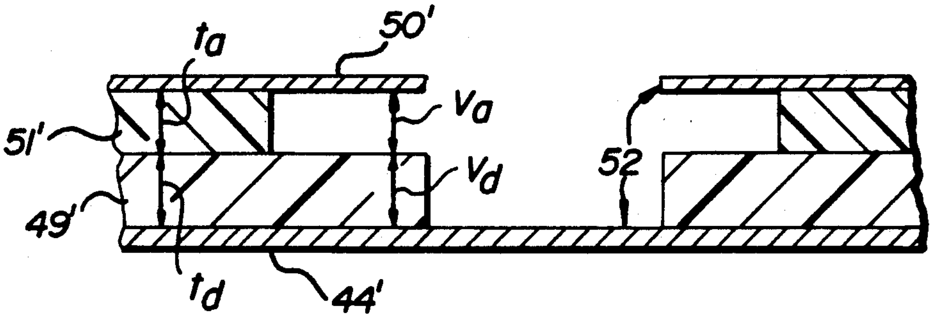
FIG. 6 is a sectional schematic view modelling the electrical characteristics of the device of FIG. 4.
Figure 7:
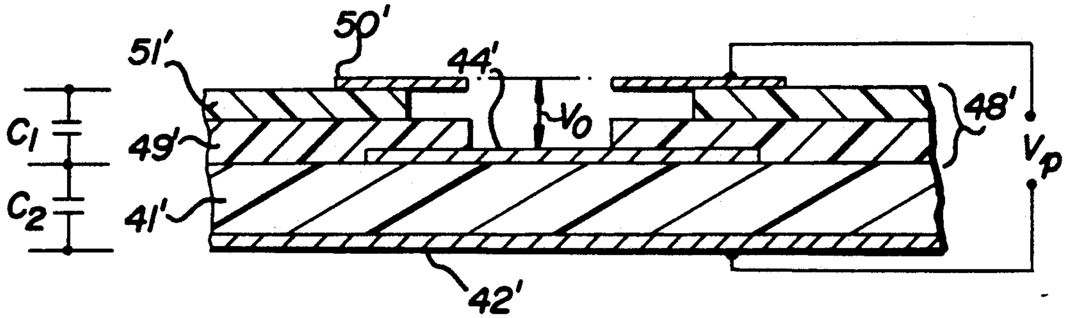
FIG. 7 is a further sectional schematic diagram modelling the electrical characteristics of the device of FIG. 5.

Reference may now be had to FIGS. 6 and 7 for an explanation of the electrical principles underlying the device of FIGS. 4–6. The structure of FIG. 6 models the isolation and discharge electrodes as conductors 44' 50' and shows stepped dielectrics 49', 51'. $V_o$ is the applied potential difference between electrodes 44', 50'; $t_a$ and $t_d$ are the thicknesses of dielectrics 51' and 49' respectively; and $K_d$ is the dielectric constant of dielectric 49'. The air equivalent dielectric thickness of dielectric 49' is $t_e = t_d/K_d$. Therefore the air gap voltage $V_a = -V_o[t_a/(t_e + t_a)]$ or $V_a = V_o + t_a)]$. From this formula, as $K_d$ becomes very large $V_a$ approaches $V_o$. One can calculate the breakdown voltage across the air gap 52 using Paschen curves.

Referring now to FIG. 7, in practice the applied potential $V_p$ in the illustrated geometry (which models the charged particle generator of FIG. 4) is applied between electrodes 42', 50' rather than electrodes 44', 50'. This structure acts as a capacitive divider to reduce the potential $V_o$ by the formula $V_o = V_p(C_1 C_2)(C_1 + C_2$, where $C_1$ represents the aggregate capacitance of the dielectrics 49', 51' and $C_2$ represents the capacitance of the solid dielectric layer 41'. For example, if $C_1 = C_2$, then $V_o = V_p/2$. It is desirable to design the patterns of electrodes 42, 44, and 50 so that electrodes 42 and 50 form a two dimensional array as required for multiplexing, while electrodes 44 comprise discrete circular disks.

Figure 8:
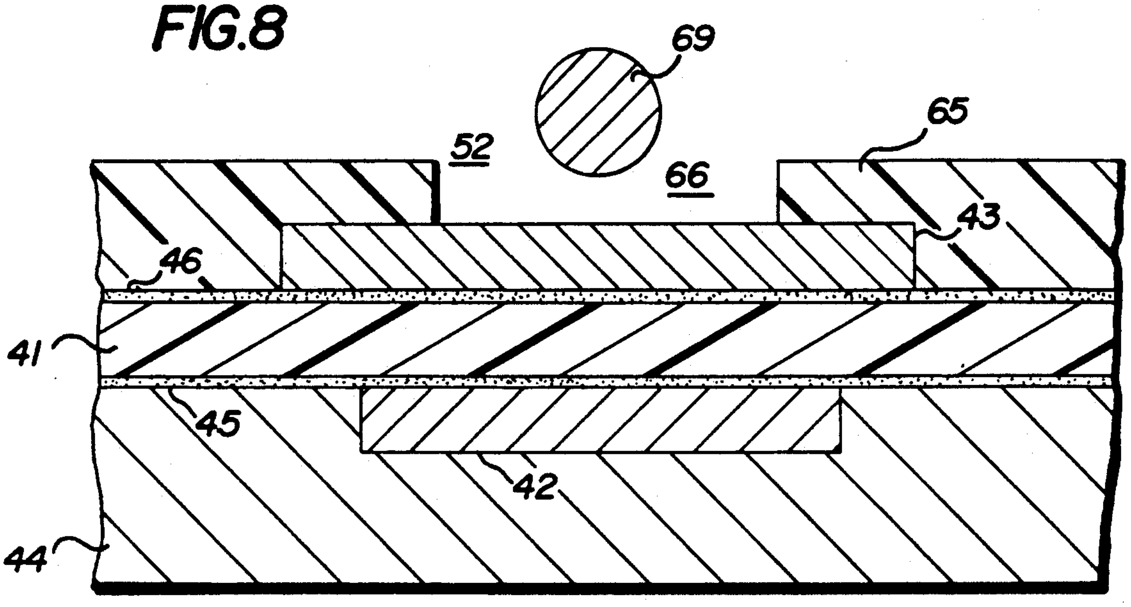
FIG. 8 is a sectional schematic view of a charged particle generator according to an alternative embodiment of the invention.
Figure 9:
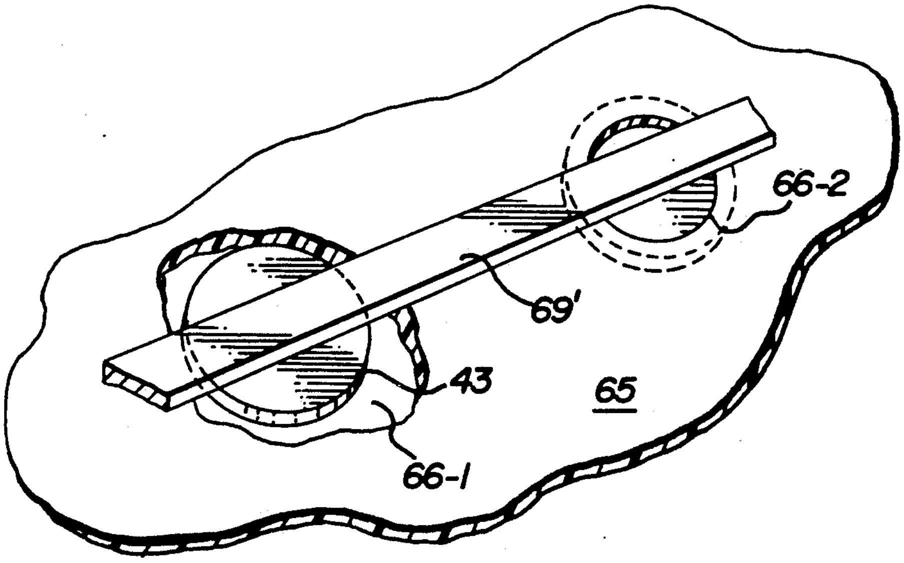
FIG. 9 is a partial perspective view of a charged particle generator of the type shown in FIG. 8.

In an alternative embodiment of the invention, shown in FIG. 8, 9, the drive electrode 42, isolation electrode 44, solid dielectric member 41 and bonding layers 45, 46 are identical to FIG. 4. In this embodiment, however, the discharge electrode 69 comprises an elongate conductor which is centered over isolation electrode 44. In FIG. 8, the discharge electrode 69 comprises a wire. In the partial perspective view of FIG. 9, discharge electrode 6' comprises an etched conductive strip, which is supported by dielectric layer 65. Dielectric layer 65 contains a series of apertures two of which are shown at 66-1 and 66-2. Dielectric layer 65 is partially removed around aperture 66-1 to completely expose isolation electrode 43 which comprises a circular disk. In practice, as seen at aperture 66-2, electrode 43 is partially covered around its circumference by layer 65. In this embodiment electrical discharges between the discharge electrode 69 and isolation electrode 44 occur in the discharge region defined by the aperture 66, which as in the first embodiment does not border on the solid dielectric member 41. See Example 3.

The metal-to-metal electrical discharges may be generated in air as typifies the prior art of silent electric discharge charged particle generators, which are exposed to ambient atmosphere. Alternatively, nitrogen, an elemental noble gas or a mixture of noble gasses, or a mixture of the above may be introduced into the discharge region, in accordance with commonly assigned U.S. patent application Ser. No. 352,395 filed May 15, 1989. The introduction of such gasses into the discharge region is observed to reduce the inception voltage, and improve operating life by reducing deterioration of structures proximate the discharge region.

EXAMPLE 1

A charged particle generating print head in accordance with FIG. 4 was constructed as follows. The dielectric 41 comprised a 0.001 inch thick Kapton film (Kapton is the registered trademark of E. I. DuPont de Nemours & Co., Wilmington, Del. for polyimide films). Both faces of the film were dip coated with an organopolysiloxane pressure sensitive adhesive and 0.001 inch thick stainless steel foil sheets were bonded to both faces of the Kapton film. The stainless steel foil was etched in a pattern of drive lines and ten mil diameter circular isolation electrodes. Dielectric layer 49 was formed from aqueous processable Vacrel® solder mask. (Vacrel is a registered trademark of E. I. Du Pont de Nemours & Co., Wilmington, Del. for a photopolymer film solder mask). Dielectric layer 51 was formed from 1.5 mil type AX semi aqueous dry film photoresist from Morton Thiakol Dynachem Co., 110L Comerce Way, Woburn, Mass. 01801. The Vacrel material was processed according to the manufacturer's specifications. The type AX photoresist was used for adhesion purposes rather than the intended purpose of photoetching. The photoresist was hot roll laminated to the back side of electrode 50; see FIG. 4. The photoresist covering the holes was then removed. This was done by developing out the photoresist from the uncoated side while keeping the photoresisted side against its Mylar cover layer.

An excition voltage at a frequency of 2.5 MHZ was placed between the RF line and the discharge electrode, and the level of this potential was increased until glow discharge was observed at an inception voltage of 2500 volts. During the first cycle or two the discharge was observed between the discharge electrode and the dielectric shelf, and in subsequent cycles discharges passed directly between the isolation and discharge electrodes.

EXAMPLE 2

The design shown in FIG. 4 was modified by replacing the 1.5 mil photoresist of dielectric spacer layer 51 with 0.1 mil polysiloxane adhesive. This increased inception voltage from 2,500 V to over 2,700 V. It is theorized by the applicants that the dielectric shelf (space provided between dielectric 49 and electrode 50) lowers inception voltage by providing an area where initial discharge can occur during the first RF cycles, thus allowing for easier formation of subsequent discharges between electrodes 44 and 50.

EXAMPLE 3

A print cartridge was constructed with the coaxial geometry illustrated in FIG. 8. Inception voltage was measured at 1,600 V with a critical voltage of 2,100 V. Applicants theorize that the lower inception and critical voltages as compared with FIGS. 6 and 7 may be due to the ease of corona formation observed in a 2.0 mil wire coupled with the fact that the geometry of FIG. 8 provides a variable discharge gap. This variable gap, it is thought, permits discharge to occur across an optimum gap width.

What is claimed is:

1. Apparatus for generating charged particles, comprising a first solid dielectric member having first and second sides;

a drive electrode substantially in contact with the first side of the first solid dielectric member;

an isolation electrode substantially in contact with the second side of the first solid dielectric member opposite said drive electrode, said isolation electrode being a circular disk;

a discharge electrode;

a second solid dielectric member which separates the discharge electrode from the first solid dielectric member, wherein the isolation electrode, discharge electrode, and second solid dielectric member define a discharge region which does not border on the first solid dielectric member; and a high voltage time varying potential ("excitation potential") placed between said drive electrode and discharge electrode to generate charged particles in said discharged region.

2. Apparatus for generating charged particles, comprising a first solid dielectric member having first and second sides;

a drive electrode substantially in contact with the first side of the first solid dielectric member;

an isolation electrode substantially in contact with the second side of the first solid dielectric member opposite said drive electrode;

a discharge electrode;

a second solid dielectric member which separates the discharge electrode from the first solid dielectric member, wherein the isolation electrode, discharge electrode, and second solid dielectric member define a discharge region which does not border on the first solid dielectric member; and a high voltage time varying potential ("excitation potential") placed between said drive electrode and discharge electrode to generate charged particles in said discharge region, wherein the discharge electrode has an aperture which is substantially aligned with the isolation electrode, and the second solid dielectric member includes a dielectric shelf which is separated from the discharge electrode by a first portion of the discharge region which is narrower than a second portion of the discharge region between the discharge electrode and isolation electrode.

3. Apparatus as defined in claim 2, for generating electrostatic images on a dielectric imaging member with an associated counterelectrode, further comprising a direct current potential ("extraction potential") placed between the discharge electrode and counterelectrode to attract charged particles of a given polarity from the discharge region to the dielectric imaging member.

4. Apparatus as defined in claim 3 wherein the counterelectrode has a positive potential relative to the discharge electrode, thereby to attract negatively charged particles to the dielectric imaging member.

5. Apparatus as defined in claim 3, including a plurality of drive electrodes and a plurality of discharge electrodes forming a multiplexable matrix, matrix crossover points being associated with given isolation electrodes.

6. Apparatus as defined in claim 2 wherein the second solid dielectric member further comprises a solid dielectric spacer member which together with the first portion of the discharge region separates the discharge electrode from the dielectric shelf.

7. Apparatus as defined in claim 6 wherein the isolation electrode extends between a portion of the second solid dielectric member and the first solid dielectric member.

8. Apparatus for generating charged particles, comprising a first solid dielectric member having first and second sides;

a drive electrode substantially in contact with the first side of the first solid dielectric member;

an isolation electrode substantially in contact with the second side of the first solid dielectric member opposite said drive electrode;

a discharge electrode comprising an elongate conductor;

a dielectric layer which separates the discharge electrode from the first solid dielectric member and which supports the discharge electrode over but not contacting the isolation electrode, said dielectric layer containing an aperture which defines a discharge region which does not border on the first solid dielectric member; and a high voltage time varying potential ("excitation potential") placed between said drive electrode and discharge electrode to generate charged particles in said discharge region.

9. Apparatus as defined in claim 8 wherein the elongate conductor comprises a metal wire.

10. Apparatus as defined in claim 8 wherein the elongate conductor comprises a metal strip.

11. Apparatus as defined in claim 8 wherein the elongate conductor is supported over a plurality of isolation electrodes with associated discharge regions.

* * * * *